US012683055B2

(12) United States Patent
Deguchi et al.

(10) Patent No.: US 12,683,055 B2
(45) Date of Patent: Jul. 14, 2026

(54) MAGNETIZATION METHOD AND MAGNETIZATION APPARATUS

(71) Applicant: TOYOTA JIDOSHA KABUSHIKI KAISHA, Toyota (JP)

(72) Inventors: Junichi Deguchi, Toyota (JP); Kei Ohta, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 239 days.

(21) Appl. No.: 18/726,245

(22) PCT Filed: Dec. 12, 2022

(86) PCT No.: PCT/JP2022/045601

§ 371 (c)(1),
(2) Date: Jul. 2, 2024

(87) PCT Pub. No.: WO2023/145278

PCT Pub. Date: Aug. 3, 2023

(65) Prior Publication Data

US 2025/0149223 A1 May 8, 2025

(30) Foreign Application Priority Data

Jan. 25, 2022 (JP) ................................ 2022-009554

(51) Int. Cl.
*H01F 13/00* (2006.01)

(52) U.S. Cl.
CPC ................................ *H01F 13/003* (2013.01)

(58) Field of Classification Search
CPC ............................ H01F 13/003; H02K 15/03
See application file for complete search history.

(56) References Cited

FOREIGN PATENT DOCUMENTS

JP 2008-159668 A 7/2008
JP 2021-93899 A 6/2021

*Primary Examiner* — Mohamad A Musleh
(74) *Attorney, Agent, or Firm* — Sughrue Mion, PLLC

(57) ABSTRACT

A magnetization method according to one aspect of the present disclosure, which is a method for magnetizing magnetic bodies in which at least a first magnetic body, a second magnetic body, and a third magnetic body are aligned, includes a heteropolar magnetization process. In this process, heteropolar magnetic fields are generated in a first magnetization yoke and a second magnetization yoke that are opposed to each other in a radial direction with a first magnetic body before magnetization interposed therebetween, and heteropolar magnetic fields are generated in a third magnetization yoke and a fourth magnetization yoke that are opposed to each other in a radial direction with the third magnetic body before magnetization interposed therebetween. In the heteropolar magnetization process, an amount of magnetic flux flowing through the first magnetic body is made larger than an amount of magnetic flux flowing through the third magnetic body.

9 Claims, 3 Drawing Sheets

MAGNETIZATION METHOD AND MAGNETIZATION APPARATUS

This is a National Stage Application of International Application No. PCT/JP2022/045601 filed Dec. 12, 2022, claiming priority based on Japanese Patent Application No. 2022-009554 filed Jan. 25, 2022.

TECHNICAL FIELD

The present disclosure relates to a magnetization method and a magnetization apparatus.

BACKGROUND ART

In recent years, practical use of a rotor including magnets arranged in a Halbach array has begun. In an example of this type of rotor, Patent Literature 1 discloses a method for manufacturing a rotor for a washing machine, including a magnet arrangement process, a resin molding process, and a post-magnetizing process. The magnet arrangement process is a process for alternately arranging main magnets which have not been magnetized and auxiliary magnets which have not been magnetized in a circumferential direction in a resin mold die to align these magnets in a circular shape or an arc shape. The aforementioned resin molding process is a process in which the above resin mold die is filled with resin and then resin molding is performed.

The aforementioned post-magnetizing process is a process of magnetizing the aforementioned main magnets and the aforementioned auxiliary magnets that are resin-molded and forming Halbach array magnets with 90-degree orientation, and includes a homopolar magnetization process and a heteropolar magnetization process. The aforementioned homopolar magnetization process is a process of generating homopolar magnetic fields in a first magnetization yoke and a second magnetization yoke that are opposed to each other and generating homopolar magnetic fields in a third magnetization yoke and a fourth magnetization yoke that are opposed to each other. The above heteropolar magnetization process is a process for generating heteropolar magnetic fields in the first magnetization yoke and the second magnetization yoke that are opposed to each other and generating heteropolar magnetic fields in the third magnetization yoke and the fourth magnetization yoke that are opposed to each other.

CITATION LIST

Patent Literature

[Patent Literature 1] Japanese Unexamined Patent Application Publication No. 2021-093899

SUMMARY OF INVENTION

Technical Problem

As described above, in the technique disclosed in Patent Literature 1, the homopolar magnetization process is performed for applying a 90-degree transverse magnetic flux and the heteropolar magnetization process is performed for applying a 90-degree vertical magnetic flux. In the technique disclosed in Patent Literature 1, however, the amount of right and left magnetic flux is not taken into consideration in performing the heteropolar magnetization process, and thus the influence of magnets where magnetic flux is applied in a 90-degree transverse direction is not taken into consideration. Therefore, the magnetic force of the auxiliary magnets is not sufficiently strong and thus Halbach array magnets having a desired magnetic force cannot be formed.

The present disclosure has been made in view of the aforementioned problem, and an object of the present disclosure is to provide a magnetization method and a magnetization apparatus capable of easily forming Halbach array magnets having a desired magnetic force when a plurality of magnetic bodies in which at least a first magnetic body, a second magnetic body, and a third magnetic body are aligned are magnetized.

Solution to Problem

A magnetization method according to one aspect of the present disclosure is a magnetization method for magnetizing a plurality of magnetic bodies in which at least a first magnetic body, a second magnetic body, and a third magnetic body are aligned, the magnetization method including: a heteropolar magnetization process for generating heteropolar magnetic fields in a first magnetization yoke and a second magnetization yoke that are opposed to each other in a radial direction with the first magnetic body before magnetization interposed therebetween and generating heteropolar magnetic fields in a third magnetization yoke and a fourth magnetization yoke that are opposed to each other in a radial direction with the third magnetic body before magnetization interposed therebetween, in which in the heteropolar magnetization process, an amount of magnetic flux that flows through the first magnetic body is made larger than an amount of magnetic flux that flows through the third magnetic body. Accordingly, magnetization can be performed on the first magnetic body and the third magnetic body as well in view of the magnetic force applied to the second magnetic body, whereby it is possible to easily form Halbach array magnets having a desired magnetic force.

The magnetization method may further include a homopolar magnetization process that is performed before the heteropolar magnetization process is performed, in which in the homopolar magnetization process, the second magnetic body may be magnetized by generating homopolar magnetic fields in the first magnetization yoke and the second magnetization yoke in such a way that a magnetic flux propagates toward the first magnetic body and by generating homopolar magnetic fields in the third magnetization yoke and the fourth magnetization yoke in such a way that a magnetic flux propagates away from the third magnetic body. Accordingly, before the heteropolar magnetization process is performed, magnetization can be performed on the second magnetic body in advance. Therefore, it becomes easy to perform adjustment so as to equally perform magnetization on the first magnetic body and the third magnetic body without reducing the magnetic force of the second magnetic body in the heteropolar magnetization process.

In the heteropolar magnetization process, magnetic fields generated in the first magnetization yoke and the second magnetization yoke may be made larger than magnetic fields generated in the third magnetization yoke and the fourth magnetization yoke, whereby an amount of magnetic flux that flows through the first magnetic body may be made larger than an amount of magnetic flux that flows through the third magnetic body. Accordingly, by adjusting the magnetic field to be generated, the amount of magnetic flux that flows through the first magnetic body can be made larger than the amount of magnetic flux that flows through the third magnetic body, whereby it is possible to easily adjust the amount of magnetic flux.

By making an arrangement gap between the first magnetization yoke and the first magnetic body and between the second magnetization yoke and the first magnetic body smaller than an arrangement gap between the third magnetization yoke and the third magnetic body and between the fourth magnetization yoke and the third magnetic body, an amount of magnetic flux that flows through the first magnetic body may be made larger than an amount of magnetic flux that flows through the third magnetic body in the heteropolar magnetization process. Accordingly, by adjusting the arrangement, the amount of magnetic flux that flows through the first magnetic body can be made larger than the amount of magnetic flux that flows through the third magnetic body, whereby it is possible to easily adjust the amount of magnetic flux.

A magnetization apparatus according to another aspect of the present disclosure is a magnetization apparatus for magnetizing a plurality of magnetic bodies in which at least a first magnetic body, a second magnetic body, and a third magnetic body are aligned, in which the magnetization apparatus includes a heteropolar magnetizing unit that generates heteropolar magnetic fields in a first magnetization yoke and a second magnetization yoke that are opposed to each other in a radial direction with the first magnetic body before magnetization interposed therebetween and generates heteropolar magnetic fields in a third magnetization yoke and a fourth magnetization yoke that are opposed to each other in a radial direction with the third magnetic body before magnetization interposed therebetween, and the heteropolar magnetizing unit makes an amount of magnetic flux that flows through the first magnetic body larger than an amount of magnetic flux that flows through the third magnetic body. Accordingly, magnetization can be performed on the first magnetic body and the third magnetic body as well in view of the magnetic force applied to the second magnetic body, whereby it is possible to easily form Halbach array magnets having a desired magnetic force.

The magnetization apparatus may further include a homopolar magnetizing unit configured to magnetize the second magnetic body by generating homopolar magnetic fields in the first magnetization yoke and the second magnetization yoke in such a way that a magnetic flux propagates toward the first magnetic body and by generating homopolar magnetic fields in the third magnetization yoke and the fourth magnetization yoke in such a way that a magnetic flux propagates away from the third magnetic body, in which the homopolar magnetizing unit may generate homopolar magnetic fields before generation of the heteropolar magnetic fields in the heteropolar magnetizing unit. Accordingly, before the magnetization in the heteropolar magnetizing unit, magnetization can be performed on the second magnetic body in advance. Therefore, it becomes easy to perform adjustment so as to equally perform magnetization on the first magnetic body and the third magnetic body without reducing the magnetic force of the second magnetic body in the heteropolar magnetizing unit.

The heteropolar magnetizing unit may make magnetic fields generated in the first magnetization yoke and the second magnetization yoke larger than magnetic fields generated in the third magnetization yoke and the fourth magnetization yoke, whereby an amount of magnetic flux that flows through the first magnetic body may be made larger than an amount of magnetic flux that flows through the third magnetic body. Accordingly, by adjusting the magnetic field to be generated, the amount of magnetic flux that flows through the first magnetic body can be made larger than the amount of magnetic flux that flows through the third magnetic body, whereby it is possible to easily adjust the amount of magnetic flux.

The heteropolar magnetizing unit may perform arrangement in such a way that an arrangement gap between the first magnetization yoke and the first magnetic body and between the second magnetization yoke and the first magnetic body may be made smaller than an arrangement gap between the third magnetization yoke and the third magnetic body and between the fourth magnetization yoke and the third magnetic body, whereby an amount of magnetic flux that flows through the first magnetic body may be made larger than an amount of magnetic flux that flows through the third magnetic body. Accordingly, by adjusting the arrangement, the amount of magnetic flux that flows through the first magnetic body can be made larger than the amount of magnetic flux that flows through the third magnetic body, whereby it is possible to easily adjust the amount of magnetic flux.

Advantageous Effects of Invention

According to the present disclosure, it is possible to provide a magnetization method and a magnetization apparatus capable of forming Halbach array magnets having a desired magnetic force when a plurality of magnetic bodies in which at least a first magnetic body, a second magnetic body, and a third magnetic body are aligned are magnetized.

DESCRIPTION OF EMBODIMENTS

Hereinafter, with reference to the drawings, specific embodiments to which the present disclosure is applied will be described in detail. However, the present disclosure is not limited to the following embodiments. Further, for the sake of clarification of the description, the following descriptions and the drawings are simplified as appropriate.

First Embodiment

Figure 1:
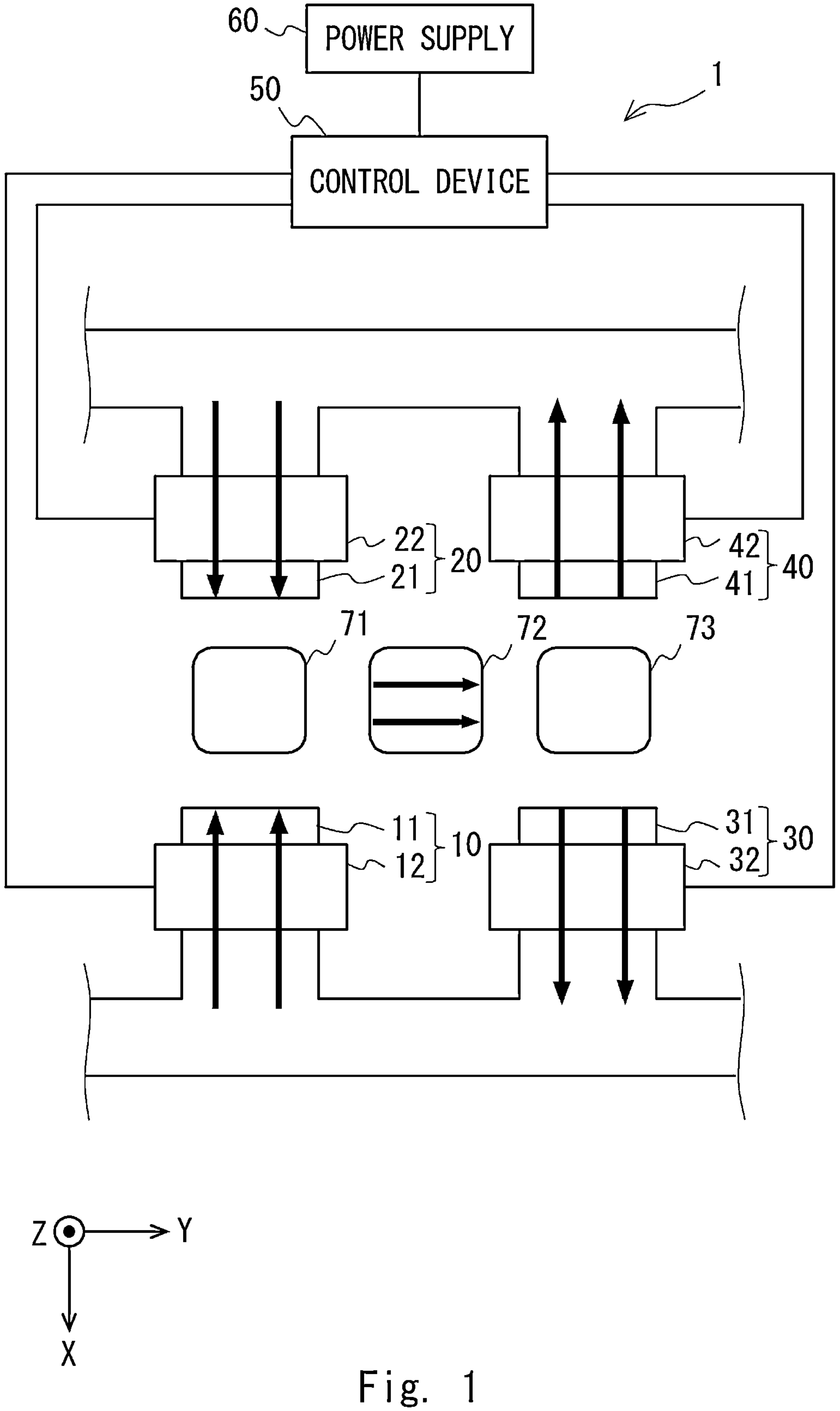
FIG. 1 is a diagram showing a state in which a homopolar magnetization process is performed on magnetic bodies using a magnetization apparatus according to a first embodiment.
Figure 2:
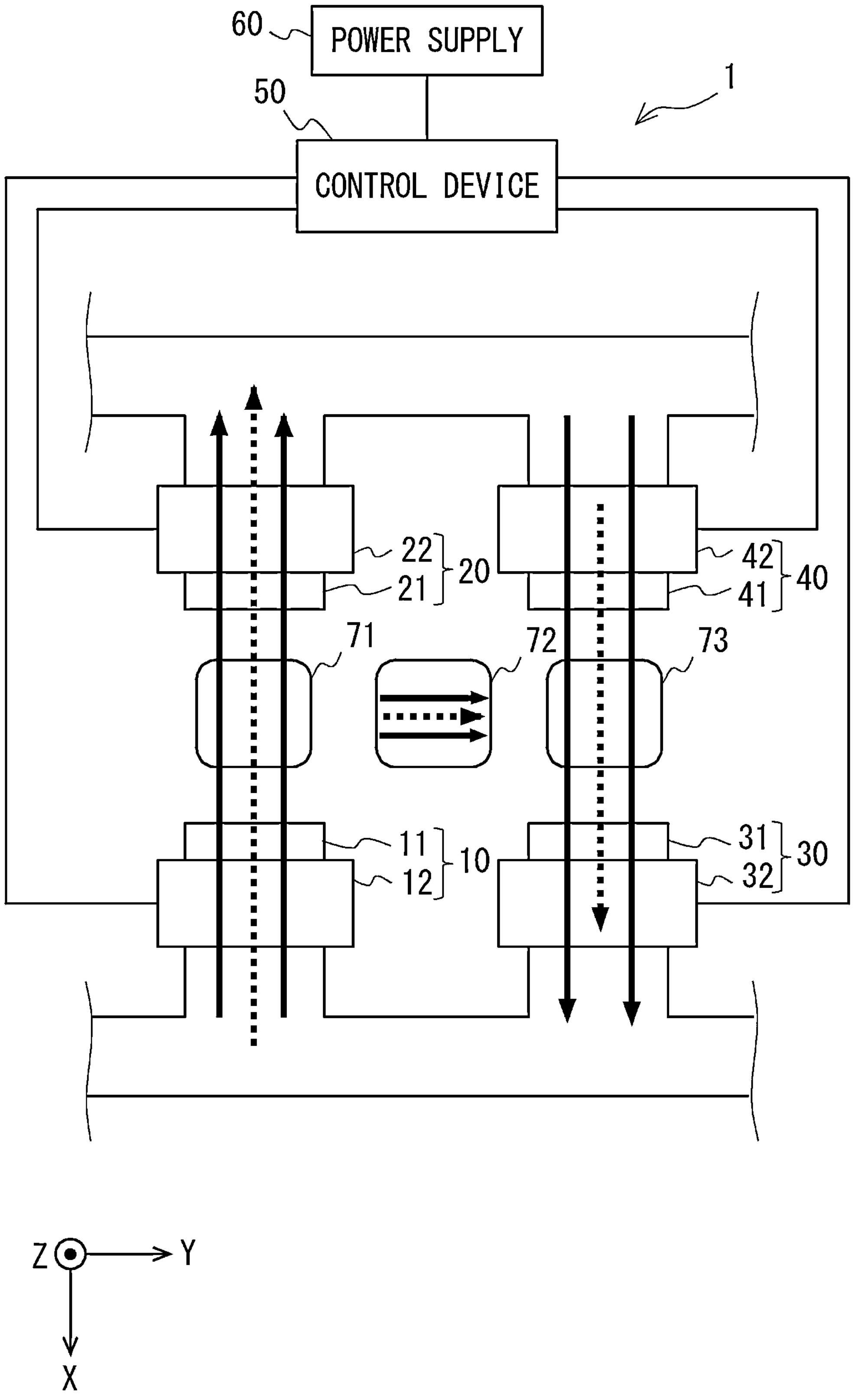
FIG. 2 is a diagram showing a state in which a heteropolar magnetization process is performed on the magnetic bodies using the magnetization apparatus according to the first embodiment.

With reference to FIGS. 1 and 2, one example of a configuration example of a magnetization apparatus and a magnetization method according to a first embodiment will be described. FIG. 1 shows a diagram showing a state in which a homopolar magnetization process is performed on magnetic bodies (magnetic material pieces) using the magnetization apparatus according to this embodiment. FIG. 2 shows a diagram showing a state in which a heteropolar magnetization process is performed on the magnetic bodies using the magnetization apparatus according to this embodiment.

In the following description, not only in this embodiment but also in the second and third embodiments as well, in order to clarify the explanation, throughout the drawings, a three-dimensional (XYZ) coordinate system is used, the orientation of each magnetic field to be generated will be shown by a solid arrow, the orientation and the magnitude of a magnetic flux (an amount of magnetic flux), or in other words, the orientation of magnetization and a magnetizing force will be shown by a dashed arrow. Note that the orientations and amounts of the magnetic flux are shown for conceptual purposes only, and do not always express the actual orientations and actual amounts of magnetic flux.

Further, in FIGS. 1 and 2, as a first magnetic body 71, a second magnetic body 72, and a third magnetic body 73 that are shown as magnetic bodies to be magnetized, a part of a magnetization apparatus 1 and magnetic bodies to be magnetized is extracted in a simplified manner. However, in this embodiment, it is sufficient that a plurality of magnetic bodies in which at least the first magnetic body 71, the second magnetic body 72, and the third magnetic body 73 are aligned be magnetized.

For example, the plurality of magnetic bodies to be magnetized may be aligned, like the first magnetic body 71, the second magnetic body 72, the third magnetic body 73, a second magnetic body that is equivalent to the second magnetic body 72, a first magnetic body that is equivalent to the first magnetic body 71, . . . . However, orientations of magnetization of second magnetic bodies that are closest to each other are opposite from each other. While each of the magnetic bodies can be formed of a magnetic material such as ferrite, the type and the component of the magnetic material is not limited as long as they can be magnetized.

Further, while the first magnetic body 71, the second magnetic body 72, and the third magnetic body 73 have a substantially rectangular shape when they are seen from the Z-axis direction in FIGS. 1 and 2, the shape of the first magnetic body 71, the second magnetic body 72, and the third magnetic body 73 can be changed as appropriate. As illustrated in FIG. 1, the magnetization apparatus 1 according to this embodiment includes a first magnetizer 10, a second magnetizer 20, a third magnetizer 30, and a fourth magnetizer 40, and may include a power supply 60 that supplies power to them and a control device 50 that controls the power supply 60.

The first magnetizer 10 may include a first magnetization yoke 11 and a first coil 12, the second magnetizer 20 may include a second magnetization yoke 21 and a second coil 22, the third magnetizer 30 may include a third magnetization yoke 31 and a third coil 32, and the fourth magnetizer 40 may include a fourth magnetization yoke 41 and a fourth coil 42.

As shown in FIGS. 1 and 2, for example, the first magnetization yoke 11 and the second magnetization yoke 21 may each be a comb-tooth-shaped magnetic body in which the X-axis negative side and the X-axis positive side are opened. The third magnetization yoke 31 and the fourth magnetization yoke 41 may also each be, as shown in FIGS. 1 and 2, for example, a comb-tooth-shaped magnetic body in which the X-axis negative side and the X-axis positive side are opened.

As shown in FIG. 2, for example, the shape of the first magnetization yoke 11 and the second magnetization yoke 21 may be any shape so that a magnetic flux can be made to flow therethrough (a magnetic path is formed) via the first magnetic body 71 in a state in which the first magnetic body 71 that may generate magnetic orientation in the negative direction of the X axis is arranged. Further, as shown in FIG. 2, for example, the shape of the third magnetization yoke 31 and the fourth magnetization yoke 41 may be any shape so that a magnetic flux can be made to flow therethrough (a magnetic path is formed) via the third magnetic body 73 in a state in which the third magnetic body 73 that may generate the magnetic orientation in the positive direction of the X axis is arranged.

However, each of the magnetization yokes 11, 21, 31, and 41 is formed, as shown in FIG. 1, for example, in a shape where a magnetic flux loop can be formed through the second magnetic bodies 72 in a state in which the second magnetic bodies 72 that may generate magnetic orientation in a direction that is tilted by 90 degrees in a counterclockwise direction relative to the X-axis direction (the positive direction of the Y axis) are arranged in the Y-axis direction with gaps therebetween. Further, while the material of each of the magnetization yokes 11, 21, 31, and 41, i.e., the material of the core of the magnetizing unit, can be iron, a material other than iron may be adopted.

The first coil 12 is wound around a part of the first magnetization yoke 11 that is extended in the X-axis direction. The third coil 32 is wound around a part of the third magnetization yoke 31 that is extended in the X-axis direction. While the first magnetization yoke 11 and the third magnetization yoke 31 can be coupled to each other as shown in FIG. 1 and so on, they may be formed separately from each other. The second coil 22 is wound around a part of the second magnetization yoke 21 that is extended in the X-axis direction. The fourth coil 42 is wound around a part of the fourth magnetization yoke 41 that is extended in the X-axis direction. While the second magnetization yoke 21 and the fourth magnetization yoke 41 can be coupled to each other as shown in FIG. 1 and so on, they may be formed separately from each other.

The power supply 60 supplies power to the first coil 12, the second coil 22, the third coil 32, and the fourth coil 42, and generates a magnetic field in each of the first magnetization yoke 11, the second magnetization yoke 21, the third magnetization yoke 31, and the fourth magnetization yoke 41 corresponding to them, respectively.

The control device 50 may be configured to control the entire magnetization apparatus 1. The control device 50 controls, for example, the current supplied from the power supply 60 to the first coil 12, the second coil 22, the third coil 32, and the fourth coil 42, thereby controlling the polarity and the size of the magnetic field generated in each of the first magnetization yoke 11, the second magnetization yoke 21, the third magnetization yoke 31, and the fourth magnetization yoke 41. This control means control of magnetization to the first magnetic body 71, the second magnetic body 72, and the third magnetic body 73.

The control device 50 may be formed, for example, by a processor such as a Central Processing Unit (CPU), a working memory, and a non-volatile storage device, or by other special-purpose Integrated Circuit (IC) or the like. A program for magnetization control performed by the processor may be stored in this storage device and the processor may load this program into a working memory and executes this loaded program, whereby the function of the control device 50 can be implemented.

In this embodiment, a homopolar magnetization process, which is a first magnetizing process, is performed using the magnetization apparatus 1 in the aforementioned configuration, and then a heteropolar magnetization process, which is a second magnetizing process, is performed. In the homopolar magnetization process, as shown in FIG. 1, magnetization is performed on the magnetic bodies 71-73

(actually the magnetic body 72 is the magnetization target). In the heteropolar magnetization process that is performed next, magnetization is performed on the magnetic bodies 71-73, as shown in FIG. 2. Hereinafter, each process will be described in detail.

First, with reference to FIG. 1, the homopolar magnetization process will be described. The homopolar magnetization process can be performed as the control device 50 performs control in such a way that the first magnetizer 10, the second magnetizer 20, the third magnetizer 30, and the fourth magnetizer 40 shown in FIG. 1 have the function of the homopolar magnetizing unit as follows.

The aforementioned homopolar magnetizing unit causes homopolar magnetic fields to be generated in the first magnetization yoke 11 and the second magnetization yoke 21 that are opposed to each other in the radial direction in such a way that the magnetic flux propagates toward the first magnetic body 71. That is, the homopolar magnetizing unit causes, as shown in FIG. 1, the magnetic field in the negative direction of the X axis to make the magnetic flux flow toward the first magnetic body 71 to be generated in the first magnetization yoke 11, and causes the magnetic field in the positive direction of the X axis to make the magnetic flux flow toward the first magnetic body 71 to be generated in the opposing second magnetization yoke 21.

At the same time, the homopolar magnetizing unit causes homopolar magnetic fields to be generated in the third magnetization yoke 31 and the fourth magnetization yoke 41 that are opposed to each other in the radial direction in such a way that the magnetic flux propagates away from the third magnetic body 73. That is, as shown in FIG. 1, the homopolar magnetizing unit causes the magnetic field in the positive direction of the X axis to make the magnetic flux propagate away from the third magnetic body 73 to be generated in the third magnetization yoke 31, and causes the magnetic field in the negative 0 direction of the X axis to make the magnetic flux propagate toward the third magnetic body 73 to be generated in the opposing fourth magnetization yoke 41.

The homopolar magnetizing unit generates homopolar magnetic fields in the above-mentioned manner, whereby the magnetic field in the positive direction of the Y axis is generated in the position of the second magnetic body 72 and the second magnetic body 72 is magnetized in this orientation, as shown in FIG. 1.

30 Next, with reference to FIG. 2, a heteropolar magnetization process that is performed after the homopolar magnetization process will be described. The heteropolar magnetization process can be performed as the control device 50 performs control in such a way that the first magnetizer 10, the second magnetizer 20, the third magnetizer 30, and the fourth magnetizer 40 shown in FIG. 2 have the function of the heteropolar magnetizing unit as follows.

The aforementioned heteropolar magnetizing unit causes heteropolar magnetic fields to be generated in the first magnetization yoke 11 and the second magnetization yoke 21 that are opposed to each other in the radial direction with the first magnetic body 71 before magnetization interposed therebetween. That is, as shown in FIG. 2, the heteropolar magnetizing unit causes the magnetic field in the negative direction of the X axis to make the magnetic flux propagate toward the first magnetic body 71 to be generated in the first magnetization yoke 11, and causes the magnetic field in the negative direction of the X axis to make the magnetic flux propagate away from the first magnetic body 71 to be generated in the opposing second magnetization yoke 21. Accordingly, as shown in FIG. 2, the heteropolar magnetizing unit causes the magnetic field in the negative direction of the X axis to be generated in the position of the first magnetic body 71 to magnetize the first magnetic body 71 in the above direction.

Further, at the same time of the generation of the magnetic fields as described above, the heteropolar magnetizing unit causes heteropolar magnetic fields to be generated in the third magnetization yoke 31 and the fourth magnetization yoke 41 that are opposed to each other in the radial direction with the third magnetic body 73 before magnetization interposed therebetween. That is, as shown in FIG. 2, the heteropolar magnetizing unit causes the magnetic field in the positive direction of the X axis to make the magnetic flux propagate away from the third magnetic body 73 to be generated in the third magnetization yoke 31, and causes the magnetic field in the positive direction of the X axis to make the magnetic field propagate toward the third magnetic body 73 to be generated in the opposing fourth magnetization yoke 41. Accordingly, the heteropolar magnetizing unit causes the magnetic field in the positive direction of the X axis to be generated in the position of the third magnetic body 73, and magnetizes the third magnetic body 73 in the above direction, as shown in FIG. 2.

In particular, the heteropolar magnetizing unit makes an amount of magnetic flux flowing through the first magnetic body 71 larger than an amount of magnetic flux flowing through the third magnetic body 73, as shown by the difference in the lengths of dashed arrows in FIG. 2. This control is performed by the control device 50 which performs control so as to generate heteropolar magnetic fields in the first magnetizer 10 and the second magnetizer 20, and by, for example, control of the control device 50 and the arrangement of each magnetization yoke with respect to the first magnetic body 71 and the third magnetic body 73, whereby the amount of magnetic flux flowing through the first magnetic body 71 is made larger than the amount of magnetic flux flowing through the third magnetic body 73.

While it is described that the heteropolar magnetization process is performed on the first magnetic body 71 before magnetization and the third magnetic body 73 before magnetization, it is not intended to exclude that some magnetization is performed due to an error or the like in the homopolar magnetization process.

Next, various examples of a method for making the amount of magnetic flux flowing through the first magnetic body 71 larger than that flowing through the third magnetic body 73 in the heteropolar magnetization process performed in the above heteropolar magnetizing unit will be described.

In the heteropolar magnetization process, magnetic fields generated in the first magnetization yoke 11 and the second magnetization yoke 21 are made larger than magnetic fields generated in the third magnetization yoke 31 and the fourth magnetization yoke 41, so that the amount of magnetic flux flowing through the first magnetic body 71 can be made larger than the amount of magnetic flux flowing through the third magnetic body 73.

As a first example, in the heteropolar magnetization process, the number of windings of the first coil 12 and the second coil 22 that generate the magnetic flux in the negative direction of the X axis is made greater than the number of windings of the third coil 32 and the fourth coil 42 that generate the magnetic flux in the positive direction of the X axis, whereby the amount of magnetic flux may be adjusted as described above.

To be more specific, in this embodiment, the homopolar magnetization process is performed as well. Therefore, for example, in the third coil 32 and the fourth coil 42 which are opposed to each other with the third magnetic body 73 interposed therebetween, the control device 50 performs switching in such a way that the number of windings of the part where the current is made to flow in the heteropolar magnetization process becomes smaller than that in the homopolar magnetization process, whereby the amount of magnetic flux can be switched as described above. Alternatively, in the first coil 12 and the second coil 22 which are opposed to each other with the first magnetic body 71 interposed therebetween, the control device 50 performs switching in such a way that the number of windings of the part where the current is made to flow in the heteropolar magnetization process becomes larger than that in the homopolar magnetization process, whereby the amount of magnetic flux can be switched as described above. As a matter of course, by employing both of these examples, the homopolar magnetization process, and the heteropolar magnetization process in which the amount of magnetic flux flowing through the first magnetic body 71 is made larger than the amount of magnetic flux flowing through the third magnetic body 73 can be performed.

As a second example, in the heteropolar magnetization process, the current value applied to the first coil 12 and the second coil 22 of the magnetizing unit which generates the magnetic flux in the negative direction of the X axis is made larger than the current value applied to the third coil 32 and the fourth coil 42 of the magnetizing unit which generates the magnetic flux in the positive direction of the X axis, whereby the amount of magnetic flux can be adjusted as described above.

As a third example, in the heteropolar magnetization process, the magnetic performance of the material of the first magnetization yoke 11 and the second magnetization yoke 21, each of which is the core of the magnetizing unit that generates the magnetic flux in the negative direction of the X axis, is made higher than that of the material of the third magnetization yoke 31 and the fourth magnetization yoke 41, each of which is the core of the magnetizing unit that generates the magnetic flux in the positive direction of the X axis, and thus the density of the magnetic flux of the former one is made higher than that of the latter one, whereby the amount of magnetic flux can be adjusted as described above.

Note that, in the third example, in the homopolar magnetization process, the control device 50 may control the amounts of the currents flowing through the coils 12, 22, 32, and 42 in such a way that they become the same when an arrangement condition or the like, such as a condition that the magnetic field can be formed in the position of the second magnetic body 72, is met, as described with reference to FIG. 1. Otherwise, the amounts of these currents may be adjusted as appropriate by the control device 50.

In the first, second, and third examples, the amount of magnetic flux flowing through the first magnetic body 71 can be made larger than the amount of magnetic flux flowing through the third magnetic body 73 by adjusting the magnetic field to be generated without changing the arrangement and the configuration of each coil, whereby it is possible to easily adjust the amount of magnetic flux.

Further, an arrangement gap between the first magnetization yoke 11 and the first magnetic body 71 and between the second magnetization yoke 21 and the first magnetic body 71 is made smaller than an arrangement gap between the third magnetization yoke 31 and the third magnetic body 73 and between the fourth magnetization yoke 41 and the third magnetic body 73, whereby the amount of magnetic flux flowing through the first magnetic body 71 can be made larger than the amount of magnetic flux flowing through the third magnetic body 73 in the heteropolar magnetization process. As examples for varying these arrangement gaps, fourth to sixth examples will be described.

As a fourth example, the gap between the first magnetization yoke 11 and the first magnetic body 71 in the X-axis direction and between the second magnetization yoke 21 and the first magnetic body 71 in the X-axis direction, each of the first magnetization yoke 11 and the second magnetization yoke 21 is the core of the magnetizing unit that generates the magnetic flux in the negative direction of the X axis, may be made smaller than the gap between the third magnetization yoke 31 and the third magnetic body 73 in the X-axis direction and between the fourth magnetization yoke 41 and the third magnetic body 73 in the X-axis direction, each of the third magnetization yoke 31 and the fourth magnetization yoke 41 is the core of the magnetizing unit that generates the magnetic flux in the positive direction of the X axis, whereby the amount of magnetic flux may be adjusted as described above.

As a fifth example, the width of the first magnetization yoke 11 and the second magnetization yoke 21, each of which is the core of the magnetizing unit that generates the magnetic flux in the negative direction of the X axis, may be made larger than the width of the third magnetization yoke 31 and the fourth magnetization yoke 41, each of which is the core of the magnetizing unit that generates the magnetic flux in the positive direction of the X axis, whereby the amount of magnetic flux may be adjusted as described above.

As a sixth example, the position of the first magnetization yoke 11 and the second magnetization yoke 21 for generating the magnetic flux in the negative direction of the X axis in the Y-axis direction (gap in the Y-axis direction) relative to the first magnetic body 71 may be made closer than the position of the third magnetization yoke 31 and the fourth magnetization yoke 41 for generating the magnetic flux in the positive direction of the X axis in the Y-axis direction (gap in the Y-axis direction) relative to the third magnetic body 73, whereby the amount of magnetic flux may be adjusted as described above.

Note that, in the fourth to sixth examples, in the homopolar magnetization process, the control device 50 may control the amounts of the currents flowing through the coils 12, 22, 32, and 42 in such a way that they become the same when an arrangement condition or the like, such as a condition that the magnetic field can be formed in the position of the second magnetic body 72, is met, as described with reference to FIG. 1. Otherwise, the amounts of these currents may be adjusted as appropriate by the control device 50.

In the fourth, fifth, and sixth examples, by adjusting the arrangement in advance, the amount of magnetic flux flowing through the first magnetic body 71 can be made larger than the amount of magnetic flux flowing through the third magnetic body 73, whereby it is possible to easily adjust the amount of magnetic flux.

Further, the amount of magnetic flux may be adjusted by combining a plurality of examples or all the examples of the first to sixth examples with each other.

As described above, in this embodiment, the heteropolar magnetizing unit generates heteropolar magnetic fields for making the amount of magnetic flux flowing through the first magnetic body 71 larger than the amount of magnetic flux flowing through the third magnetic body 73 after homopolar magnetic fields are generated in the homopolar magnetizing unit. That is, the homopolar magnetizing unit generates homopolar magnetic fields before the heteropolar magnetic fields are generated in the heteropolar magnetizing unit.

Accordingly, in this embodiment, magnetization can be performed on the first magnetic body 71 and the third magnetic body 73 as well in view of the magnetic force applied to the second magnetic body 72. More specifically, in this embodiment, the heteropolar magnetization process is performed along the orientation oriented in the second magnetic body 72 in the homopolar magnetization process, whereby it is possible to prevent the magnetization of the second magnetic body 72 from being decreased. Therefore, according to this embodiment, it is possible to easily form Halbach array magnets having a desired magnetic force.

In other words, in this embodiment, magnetization can be performed on the second magnetic body 72 in advance before magnetization in the heteropolar magnetization process and the amount of magnetic flux flowing through the first magnetic body 71 can be made larger than the amount of magnetic flux flowing through the third magnetic body 73, whereby it is possible to perform adjustment to equally magnetize the first magnetic body 71 and the third magnetic body 73 without decreasing the magnetic force of the second magnetic body 72 in the heteropolar magnetization process.

Here, a supplementary explanation of the effects of this embodiment will be given with comparative examples.

One comparative example is an example in which, after the second magnetic body 72 is magnetized in the homopolar magnetization process as illustrated in FIG. 1, magnetization is performed on the first magnetic body 71 and the third magnetic body 73 in the heteropolar magnetization process under the same conditions except for the direction of the magnetic fields. In the apparatus where magnetization is performed, an error of the equipment capacity may occur, including variations in the magnetization yokes and coils that form each magnetizing unit or variations of the gap of each magnetic body with respect to each magnetizing unit, and it is therefore possible that the balance of the magnetic flux when magnetization is performed may be lost. In this comparative example, when the magnetic flux in the positive direction of the X axis becomes strong due to the imbalance of the magnetic flux, a magnetic flux in the opposite direction occurs in the second magnetic body 72 magnetized in the positive direction of the Y axis in the homopolar magnetization process, which is a pre-process, which causes the magnetic force of the second magnetic body 72 that is intentionally magnetized to decrease.

Further, as another comparative example, even when a strong magnetic flux is made to flow through the first magnetic body 71, the second magnetic body 72, and the third magnetic body 73 at one time without performing the homopolar magnetization process, each magnetic body cannot be fully magnetized to have the required magnetic force.

On the other hand, in this embodiment, when post-magnetization of Halbach array magnets is performed, in the heteropolar magnetization process, by intentionally making, for example, the magnetic flux in the positive direction of the X axis stronger than the magnetic flux in the negative direction of the X axis, besides the magnetic flux in the positive direction of the X axis and the magnetic flux in the negative direction of the X axis, the magnetic flux can be made to flow through the positive direction of the Y axis as well.

Accordingly, in the heteropolar magnetization process according to this embodiment, magnetization to the first magnetic body 71 in the negative direction of the X axis, magnetization to the third magnetic body 73 in the positive direction of the X axis, and magnetization to the second magnetic body 72 in the positive direction of the Y axis can be promoted. Accordingly, in the heteropolar magnetization process according to this embodiment, the magnetic flux is always made to flow through the second magnetic body 72 magnetized in the Y-axis direction in the homopolar magnetization process in such a way that the magnetic force of the second magnetic body 72 is made stronger. Even if the magnetic flux in the positive direction of the X axis is made stronger in the homopolar magnetization process due to the error or the like of the equipment capacity described in the comparative example, it does not decrease the magnetic force of the second magnetic body 72. Further, in this embodiment, it is possible to prevent a phenomenon where each magnetic body cannot be fully magnetized to have the required magnetic force as in the other comparative example described above.

Second Embodiment

Figure 3:
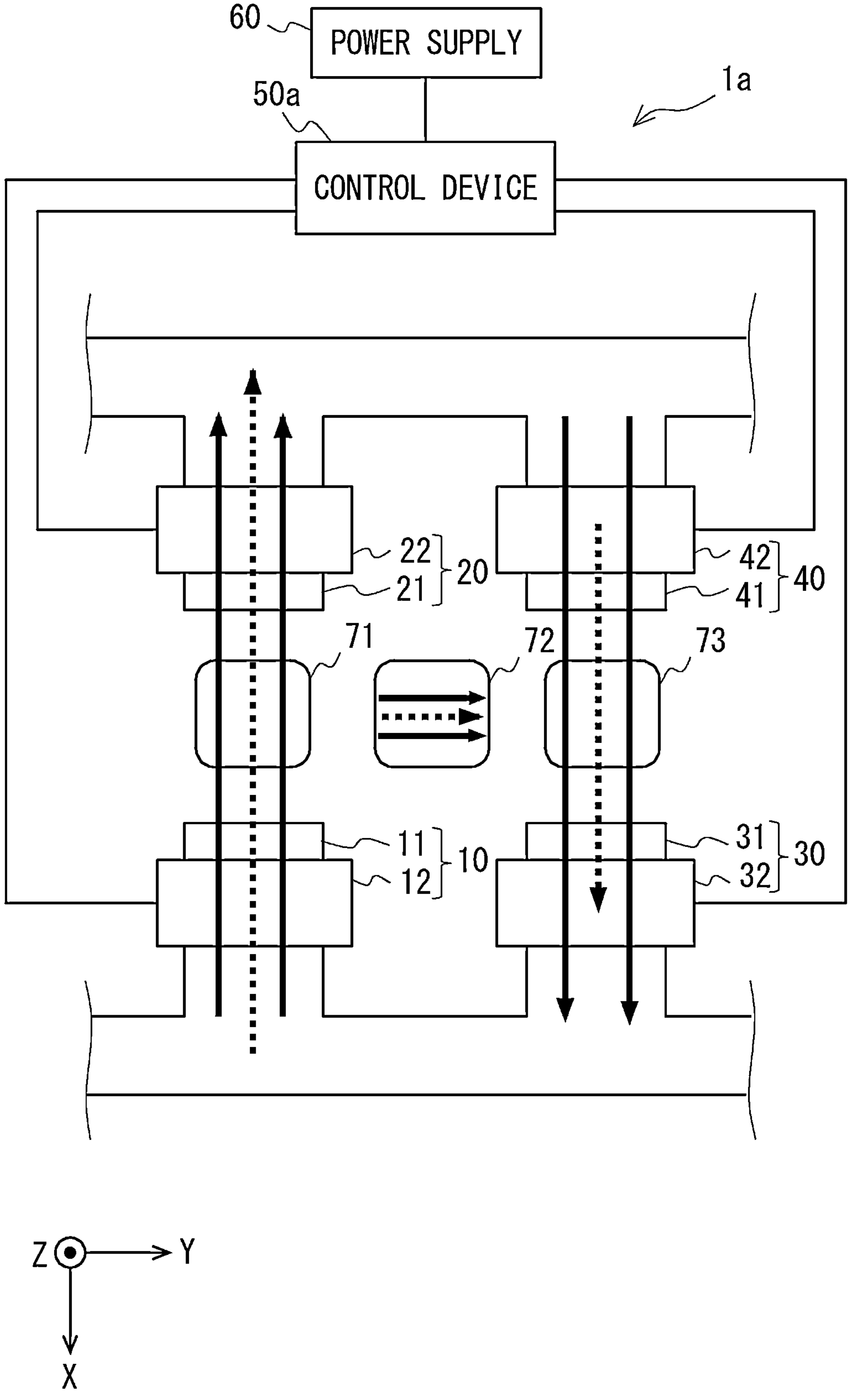
FIG. 3 is a diagram showing a state in which a heteropolar magnetization process is performed on magnetic bodies using a magnetization apparatus according to a second embodiment.

With reference to FIG. 3, one example of a configuration example of a magnetization apparatus and a magnetization method according to a second embodiment will be described. FIG. 3 is a diagram showing a state in which a heteropolar magnetization process is performed on magnetic bodies using the magnetization apparatus according to this embodiment.

Since a magnetization apparatus 1*a* according to this embodiment illustrated in FIG. 3 has a configuration substantially equal to that of the magnetization apparatus 1 according to the first embodiment, redundant descriptions will be omitted and the same elements are denoted by the same reference symbols. In FIG. 3, like in FIG. 2, a part of the magnetization apparatus 1*a* and magnetic bodies to be magnetized is extracted and shown in a simplified manner, including a first magnetic body 71, a second magnetic body 72, and a third magnetic body 73 which are shown as magnetic bodies to be magnetized.

Further, in FIG. 3 as well, the first magnetic body 71, the second magnetic body 72, and the third magnetic body 73 have a substantially rectangular shape when they are seen from the Z-axis direction. However, the shape of each of the first magnetic body 71, the second magnetic body 72, and the third magnetic body 73 can be changed as appropriate.

The magnetization apparatus 1*a* according to this embodiment shown in FIG. 3 performs only the heteropolar magnetization process without performing the homopolar magnetization process in the magnetization apparatus 1 according to the first embodiment. Therefore, the magnetization apparatus 1*a* includes, in place of the control device 50, a control device 50*a* that performs control to perform only the heteropolar magnetization process in the magnetization apparatus 1 shown in FIGS. 1 and 2. While the configuration of the control device 50 and that of the control device 50*a* may be the same, the control of at least the power supply 60 by the control device 50 is made different from the control of the power supply 60 by the control device 50*a*.

The magnetizing process according to this embodiment can be performed as the control device 50*a* performs control in such a way that a first magnetizer 10, a second magnetizer 20, a third magnetizer 30, and a fourth magnetizer 40 shown in FIG. 3 have the function of the heteropolar magnetizing unit described in the first embodiment.

That is, the above heteropolar magnetizing unit causes heteropolar magnetic fields to be generated in a first magnetization yoke 11 and a second magnetization yoke 21 that are opposed to each other in the radial direction with the first magnetic body 71 before magnetization interposed therebetween. That is, as shown in FIG. 2, the heteropolar magnetizing unit causes the magnetic field in the negative direction of the X axis to make the magnetic flux propagate toward the first magnetic body 71 to be generated in the first magnetization yoke 11, and causes the magnetic field in the negative direction of the X axis to make the magnetic flux propagate away from the first magnetic body 71 to be generated in the opposing second magnetization yoke 21. Accordingly, as shown in FIG. 3, the heteropolar magnetizing unit causes the magnetic field in the negative direction of the X axis to be generated in the position of the first magnetic body 71 to magnetize the first magnetic body 71 in the above direction.

Further, at the same time of the generation of the magnetic fields as described above, the heteropolar magnetizing unit causes heteropolar magnetic fields to be generated in the third magnetization yoke 31 and the fourth magnetization yoke 41 that are opposed to each other in the radial direction with the third magnetic body 73 before magnetization interposed therebetween. That is, as shown in FIG. 2, the heteropolar magnetizing unit causes the magnetic field in the positive direction of the X axis to make the magnetic flux propagate away from the third magnetic body 73 to be generated in the third magnetization yoke 31, and causes the magnetic field in the positive direction of the X axis to make the magnetic flux propagate toward the third magnetic body 73 to be generated in the opposing fourth magnetization yoke 41. Accordingly, the heteropolar magnetizing unit causes the magnetic field in the positive direction of the X axis to be generated in the position of the third magnetic body 73, and magnetizes the third magnetic body 73 in the above direction, as shown in FIG. 3.

In particular, the heteropolar magnetizing unit makes an amount of magnetic flux flowing through the first magnetic body 71 larger than an amount of magnetic flux flowing through the third magnetic body 73, as shown by the difference in the lengths of dashed arrows in FIG. 3. This control is performed by the control device 50*a* which performs control so as to generate heteropolar magnetic fields in the first magnetizer 10 and the second magnetizer 20, and by, for example, the control of the control device 50*a* and the arrangement of each magnetization yoke with respect to the first magnetic body 71 and the third magnetic body 73, whereby the amount of magnetic flux flowing through the first magnetic body 71 is made larger than the amount of magnetic flux flowing through the third magnetic body 73.

The method for making the amount of magnetic flux flowing through the first magnetic body 71 larger than the amount of magnetic flux flowing through the third magnetic body 73 in the heteropolar magnetization process performed in the above heteropolar magnetizing unit has been basically described in the first embodiment. However, in this embodiment, the homopolar magnetization process is not performed, which eliminates the need to consider the preliminary magnetization in the second magnetic body 72 according to the first embodiment, and the magnetization is performed on the second magnetic body 72 as well in the heteropolar magnetization process.

For example, in the first example, there is no need to provide a mechanism for switching and so on. By just making the number of windings of the first coil 12 and the second coil 22 that generate the magnetic flux in the negative direction of the X axis larger than the number of windings of the third coil 32 and the fourth coil 42 that generate the magnetic flux in the positive direction of the X axis, the amount of magnetic flux may be adjusted as described above. In the second to sixth examples as well, even in a case where adjustment or the like becomes necessary when the homopolar magnetization process is performed in the first embodiment, this adjustment or the like is unnecessary in this embodiment. Further, in this embodiment as well, a plurality of examples or all the examples in the first to sixth examples may be combined with each other to perform adjustment of the amount of magnetic flux.

As described above, in this embodiment, the heteropolar magnetizing unit generates heteropolar magnetic fields to make the amount of magnetic flux flowing through the first magnetic body 71 larger than the amount of magnetic flux flowing through the third magnetic body 73. Accordingly, in this embodiment, magnetization can be performed on the first magnetic body 71 and the third magnetic body 73 in consideration of magnetization to the second magnetic body 72 as well.

Specifically, in this embodiment, when post-magnetization of Halbach array magnets is performed, in the magnetizing process, by intentionally making, for example, the magnetic flux in the positive direction of the X axis stronger than the magnetic flux in the negative direction of the X axis, besides the magnetic flux in the positive direction of the X axis and the magnetic flux in the negative direction of the X axis, the magnetic flux can be made to flow through the positive direction of the Y axis as well. That is, in this embodiment, the heteropolar magnetization process can be performed in such a way that the magnetic flux in the positive direction of the Y axis easily flows in the position of the second magnetic body 72 as well.

Accordingly, in the magnetizing process according to this embodiment, magnetization to the first magnetic body 71 in the negative direction of the X axis, magnetization to the third magnetic body 73 in the positive direction of the X axis, and magnetization to the second magnetic body 72 in the positive direction of the Y axis can be promoted, and the magnetic flux can be applied to each of the magnetic bodies 71-73 in a direction in which it is desired to be definitely magnetized. Accordingly, with the magnetizing process according to this embodiment, it is possible to prevent a phenomenon where each magnetic body cannot be fully magnetized to have the required magnetic force, which may occur in the other comparative example as described above, and to easily form Halbach array magnets having a desired magnetic force.

Further, in this embodiment, it is possible to eliminate the homopolar magnetization process compared to the first embodiment, that is, reduce the number of required processes by one compared to the first embodiment, whereby it is possible to reduce the cost required for achieving the process.

The present disclosure is not limited to the above-described first and second embodiments, and may be changed as appropriate without departing from the spirit of the present disclosure.

For example, in the above-described first and second embodiments, the number of magnetic bodies for forming Halbach array magnets may be changed as appropriate. Note that a plurality of second magnetic bodies may be arranged between the first magnetic body and the third magnetic body. Further, the gap in the X-axis direction between the plurality of magnetic bodies to be magnetized and the magnetization yoke is not limited to the one illustrated above, and the arrangement in the Y-axis direction is not limited to the one illustrated above as well. While the example in which the central axis of the first magnetic body 71 and the central axis of the first magnetization yoke 11 and the second magnetization yoke 21 coincide with each other has been described, these axes may be deviated from each other as long as magnetization can be performed. Further, the magnetic orientation illustrated in the above embodiment is merely one example and may be changed as appropriate.

Further, the alignment of the Halbach array magnets is not limited to the linear alignment, and the magnets may be aligned in a ring shape, like in an inner rotor or an outer rotor. Further, the Halbach array magnets formed in the above embodiments may be applied to a device other than a rotor.

For example, while the magnetic bodies are arranged in the Y-axis direction, that is, in an uniaxial direction in the above-described first and second embodiments, the direction in which the magnetic bodies are arranged is not limited to the uniaxial direction, and the magnetic bodies may be arranged in a circumferential direction of a circle centered on a predetermined position.

For example, while a common power supply and a common control device are used in the above-described first and second embodiments, separate power supplies and separate control devices may be used for the respective magnetizing units.

The aforementioned program includes instructions (or software codes) that, when loaded into a computer, cause the computer to perform one or more of the functions described in the embodiments. The program may be stored in a non-transitory computer readable medium or a tangible storage medium. By way of example, and not a limitation, computer readable media or tangible storage media can include a random-access memory (RAM), a read-only memory (ROM), a flash memory, a solid-state drive (SSD) or other types of memory technologies, a CD-ROM, a digital versatile disc (DVD), a Blu-ray (registered trademark) disc or other types of optical disc storage, and magnetic cassettes, magnetic tape, magnetic disk storage or other types of magnetic storage devices. The program may be transmitted on a transitory computer readable medium or a communication medium. By way of example, and not a limitation, transitory computer readable media or communication media can include electrical, optical, acoustical, or other forms of propagated signals.

This application is based upon and claims the benefit of priority from Japanese Patent Application No. 2022-009554, filed on Jan. 25, 2022, the disclosure of which is incorporated herein in its entirety by reference.

REFERENCE SIGNS LIST

1, 1*a* MAGNETIZATION APPARATUS
10 FIRST MAGNETIZER
11 FIRST MAGNETIZATION YOKE
12 FIRST COIL
20 SECOND MAGNETIZER
21 SECOND MAGNETIZATION YOKE
22 SECOND COIL
30 THIRD MAGNETIZER
31 THIRD MAGNETIZATION YOKE
32 THIRD COIL
40 FOURTH MAGNETIZER
41 FOURTH MAGNETIZATION YOKE
42 FOURTH COIL
50, 50*a* CONTROL DEVICE
60 POWER SUPPLY
71 FIRST MAGNETIC BODY
72 SECOND MAGNETIC BODY
73 THIRD MAGNETIC BODY

The invention claimed is:

1. A magnetization method for magnetizing a plurality of magnetic bodies in which at least a first magnetic body, a second magnetic body, and a third magnetic body are aligned, the magnetization method comprising:

a heteropolar magnetization process for generating heteropolar magnetic fields in a first magnetization yoke and a second magnetization yoke that are opposed to each other in a radial direction with the first magnetic body before magnetization interposed therebetween and generating heteropolar magnetic fields in a third magnetization yoke and a fourth magnetization yoke that are opposed to each other in a radial direction with the third magnetic body before magnetization interposed therebetween, wherein in the heteropolar magnetization process, an amount of magnetic flux that flows through the first magnetic body is made larger than an amount of magnetic flux that flows through the third magnetic body.

2. The magnetization method according to claim 1, further comprising a homopolar magnetization process that is performed before the heteropolar magnetization process is performed, wherein in the homopolar magnetization process, the second magnetic body is magnetized by generating homopolar magnetic fields in the first magnetization yoke and the second magnetization yoke in such a way that a magnetic flux propagates toward the first magnetic body and by generating homopolar magnetic fields in the third magnetization yoke and the fourth magnetization yoke in such a way that a magnetic flux propagates away from the third magnetic body.

3. The magnetization method according to claim 1, wherein, in the heteropolar magnetization process, magnetic fields generated in the first magnetization yoke and the second magnetization yoke are made larger than magnetic fields generated in the third magnetization yoke and the fourth magnetization yoke, whereby an amount of magnetic flux that flows through the first magnetic body is made larger than an amount of magnetic flux that flows through the third magnetic body.

4. The magnetization method according to claim 1, comprising making an arrangement gap between the first magnetization yoke and the first magnetic body and between the second magnetization yoke and the first magnetic body smaller than an arrangement gap between the third magnetization yoke and the third magnetic body and between the fourth magnetization yoke and the third magnetic body, whereby an amount of magnetic flux that flows through the first magnetic body is made larger than an amount of magnetic flux that flows through the third magnetic body in the heteropolar magnetization process.

5. A magnetization apparatus for magnetizing a plurality of magnetic bodies in which at least a first magnetic body, a second magnetic body, and a third magnetic body are aligned, wherein the magnetization apparatus comprises a heteropolar magnetizing unit that generates heteropolar magnetic fields in a first magnetization yoke and a second magnetization yoke that are opposed to each other in a radial direction with the first magnetic body before magnetization interposed therebetween and generates heteropolar magnetic fields in a third magnetization yoke and a fourth magnetization yoke that are opposed to each other in a radial direction with the third magnetic body before magnetization interposed therebetween, and the heteropolar magnetizing unit makes an amount of magnetic flux that flows through the first magnetic body larger than an amount of magnetic flux that flows through the third magnetic body.

6. The magnetization apparatus according to claim 5, further comprising a homopolar magnetizing unit configured to magnetize the second magnetic body by generating homopolar magnetic fields in the first magnetization yoke and the second magnetization yoke in such a way that a magnetic flux propagates toward the first magnetic body and by generating homopolar magnetic fields in the third magnetization yoke and the fourth magnetization yoke in such a way that a magnetic flux propagates away from the third magnetic body, wherein the homopolar magnetizing unit generates homopolar magnetic fields before generation of the heteropolar magnetic fields in the heteropolar magnetizing unit.

7. The magnetization apparatus according to claim 5, wherein the heteropolar magnetizing unit makes magnetic fields generated in the first magnetization yoke and the second magnetization yoke larger than magnetic fields generated in the third magnetization yoke and the fourth magnetization yoke, whereby an amount of magnetic flux that flows through the first magnetic body is made larger than an amount of magnetic flux that flows through the third magnetic body.

8. The magnetization apparatus according to claim 5, wherein the heteropolar magnetizing unit performs arrangement in such a way that an arrangement gap between the first magnetization yoke and the first magnetic body and between the second magnetization yoke and the first magnetic body is made smaller than an arrangement gap between the third magnetization yoke and the third magnetic body and between the fourth magnetization yoke and the third magnetic body, whereby an amount of magnetic flux that flows through the first magnetic body is made larger than an amount of magnetic flux that flows through the third magnetic body.

9. A magnetization apparatus for magnetizing a plurality of magnetic bodies in which at least a first magnetic body, a second magnetic body, and a third magnetic body are aligned, the magnetization apparatus comprising:

at least one memory storing instructions; and at least one processor configured to execute the instructions to do a heteropolar magnetization process for generating heteropolar magnetic fields in a first magnetization yoke and a second magnetization yoke that are opposed to each other in a radial direction with the first magnetic body before magnetization interposed therebetween and generating heteropolar magnetic fields in a third magnetization yoke and a fourth magnetization yoke that are opposed to each other in a radial direction with the third magnetic body before magnetization interposed therebetween, wherein in the heteropolar magnetization process, an amount of magnetic flux that flows through the first magnetic body is made larger than an amount of magnetic flux that flows through the third magnetic body.

* * * * *